United States Patent [19] [11] Patent Number: 4,549,224
Nakamura et al. [45] Date of Patent: Oct. 22, 1985

[54] DIGITAL VIDEO TAPE RECORDER THAT CAN BE USED WITH DIFFERENT TELEVISION SYSTEMS

[75] Inventors: Masato Nakamura; Sohei Takemoto, both of Kanagawa, Japan

[73] Assignee: Sony Corporation, Tokyo, Japan

[21] Appl. No.: 487,802

[22] Filed: Apr. 22, 1983

[30] Foreign Application Priority Data

Apr. 23, 1982 [JP] Japan ................................ 57-69427

[51] Int. Cl.⁴ .............................................. H04N 9/491
[52] U.S. Cl. .................................... 358/310; 358/11; 358/324
[58] Field of Search ................ 358/310, 11, 324, 335; 360/33.1, 9.1

[56] References Cited

FOREIGN PATENT DOCUMENTS 0100792  7/1980  Japan ................................ 358/310
0042475  4/1981  Japan ................................ 358/310
0018185  1/1982  Japan ................................ 358/310
1412091 10/1975  United Kingdom ............... 358/310

OTHER PUBLICATIONS

Itoga et al; "A Triple Imaging System", Mitsubishi Denki Giho; vol. 54, No. 2, pp. 42–45 (1980).

Primary Examiner—Raymond F. Cardillo, Jr.
Assistant Examiner—Alan K. Aldous
Attorney, Agent, or Firm—Lewis H. Eslinger; Alvin Sinderbrand

[57] ABSTRACT

A digital video tape recorder (VTR) for use with an NTSC, PAL or SECAM television signal includes a reference signal generating circuit which generates a reference signal having a frequency of 13.5 MHz; a first frequency dividing circuit (1/45045) for use with an NTSC television signal; a second frequency dividing circuit (1/45000) for use with a PAL or SECAM television signal; and a switch which supplies a first or second frequency control signal to a magnetic recording head for recording a pulse of the control signal at the lower edge of a magnetic tape for each of successive, parallel tracks extending obliquely on the magnetic tape in which a television signal is recorded. A discriminator circuit detects whether the television signal to be recorded is NTSC, PAL or SECAM format and controls the switch to supply the appropriate frequency control signal to the magnetic recording head.

10 Claims, 7 Drawing Figures

FIG.5
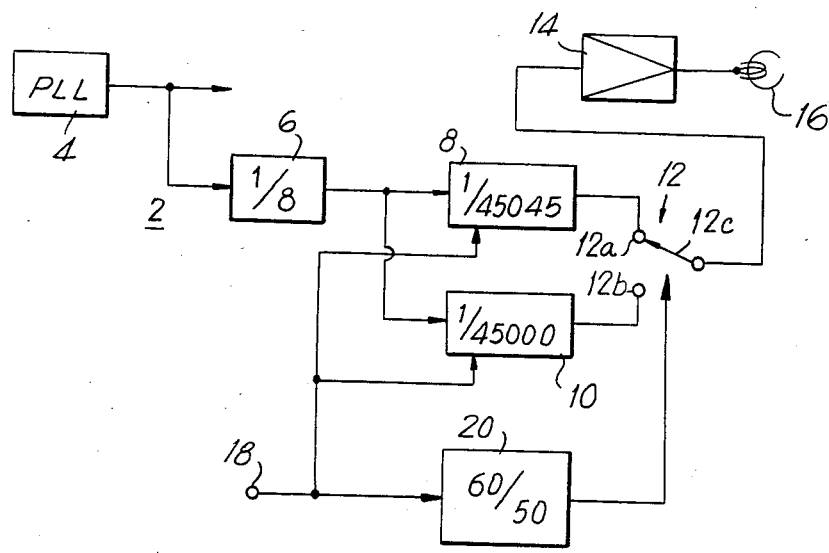
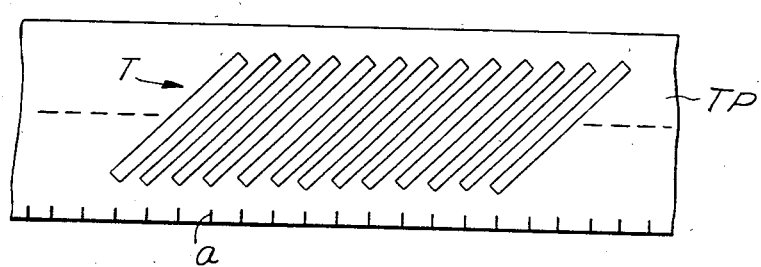
FIG.6
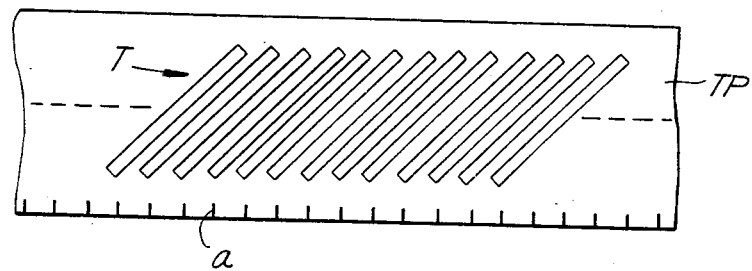
FIG.7

4,549,224

DIGITAL VIDEO TAPE RECORDER THAT CAN BE USED WITH DIFFERENT TELEVISION SYSTEMS

BACKGROUND OF THE INVENTION

This invention relates generally to information signal recording apparatus and, more particularly, is directed to a video tape recorder that can be used for recording video signals in an NTSC, PAL or SECAM television system.

Different types of television systems are used throughout the world. For example, with the NTSC television system, the television signal has a vertical scanning frequency of 60 Hz, with 525 horizontal scanning lines being included in each frame of the television signal. On the other hand, in the PAL and SECAM television systems, the vertical scanning frequency is 50 Hz, with 625 horizontal scanning lines being included in each frame of the television signal. Accordingly, there has been proposed a digital video tape recorder (VTR) for recording and reproducing NTSC, PAL and SECAM television signals. See, Television. The Journal of the Royal Television Society, September/October 1982, pages 27-31.

With the aforementioned proposed digital VTR, for the NTSC television system, the television screen corresponding to one field interval is divided into five segments. Thus, each field interval of the NTSC television signal is recorded in five successive, parallel tracks extending obliquely on the magnetic tape. In like manner, for the PAL and SECAM television systems, the television screen corresponding to one field interval is divided into six segments. Thus, each field interval of the PAL or SECAM television signal is recorded in six successive, parallel tracks extending obliquely on the magnetic tape. With all of the above television systems, a control signal used for a capstan servo operation during reproduction, is recorded in a control track at the lower edge of the magnetic tape for each field interval. This means that a control signal is recorded in the control track for every five tracks in the NTSC television system and for every six tracks in the PAL and SECAM television systems. However, since one control signal only is recorded for each plurality of tracks in the above television systems, a satisfactory capstan servo operation can not be achieved for the tracks between successive control signals. Also, this problem can not be remedied merely by dividing the control signal by a fixed value since the different television systems require different dividing ratios, dependent on the incoming television signal.

OBJECTS AND SUMMARY OF THE INVENTION

Accordingly, it is an object of this invention to provide apparatus for recording an information signal on a record medium that avoids the above-described difficulties encountered with the aforementioned arrangement.

More particularly, it is an object of this invention to provide apparatus for recording an information signal on a record medium that can be used with NTSC, PAL and SECAM television systems.

It is another object of this invention to provide apparatus for recording an information signal on a record medium that records a control signal for each record track with NTSC, PAL and SECAM television systems.

In accordance with an aspect of this invention, apparatus for recording an information signal in a plurality of parallel tracks on a record medium, includes means for generating a reference signal having a reference frequency; first means for producing a first control signal corresponding to an information signal having a first format in response to said reference signal; second means for producing a second control signal corresponding to an information signal having a second, different format in response to said reference signal; transducer means for recording one of the first control signal and the second control signal in a control track on the record medium for each of the plurality of parallel tracks; and switch means for switching one of the first control signal and the second control signal to the transducer means in response to the information signal to be recorded in the plurality of parallel tracks.

The above, and other, objects, features and advantages of the present invention will become apparent from the following detailed description thereof which is to be read in connection with the accompanying drawings.

BRIEF DESCRIPTION OF THE DRAWINGS

FIG. 5 is a block diagram of a control signal generating circuit of a VTR in accordance with one embodiment of the present invention for producing control signals for an NTSC, PAL or SECAM television system in response to the television signal to be recorded.

FIG. 6 is a schematic diagram of a portion of magnetic tape showing the recording arrangement of information tracks extending obliquely on the magnetic tape and the relation of a control signal recorded at the edge of the magnetic tape for the NTSC television system, in accordance with the circuit of FIG. 5; and FIG. 7 is a schematic diagram of a portion of magnetic tape showing the recording arrangement of information tracks extending obliquely on the magnetic tape and the relation of a control signal recorded at the edge of the magnetic tape for the PAL or SECAM television system, in accordance with the circuit of FIG. 5.

DETAILED DESCRIPTION OF A PREFERRED EMBODIMENT

As previously discussed, the NTSC television system uses 525 horizontal scanning lines for each frame of the televison signal and has a vertical frequency of 60 Hz.

Figure 1:
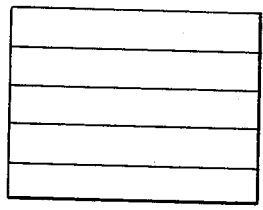
FIG. 1 is a schematic diagram of a divided screen in an NTSC television system in accordance with a previously-proposed VTR.
Figure 2:
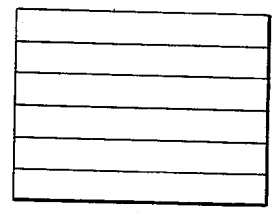
FIG. 2 is a schematic diagram of a divided screen in a PAL or SECAM television system in accordance with the previously-proposed VTR.
Figure 3:
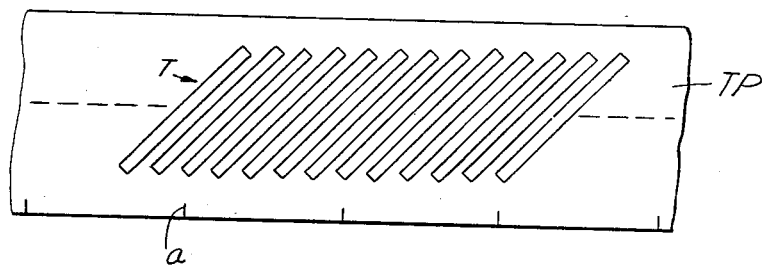
FIG. 3 is a schematic diagram of a portion of magnetic tape showing the recording arrangement of information tracks extending obliquely on the magnetic tape and the relation of a control signal recorded at the edge of the magnetic tape for the NTSC television system, in accordance with the previously-proposed VTR.
Figure 4:
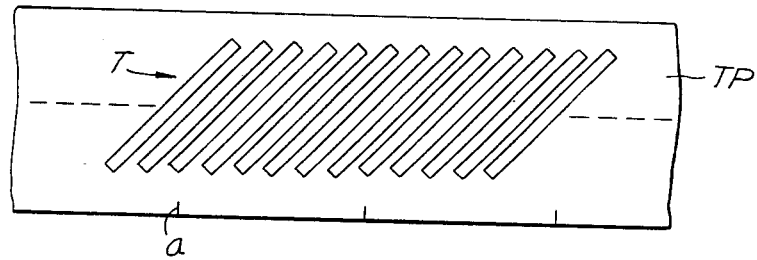
FIG. 4 is a schematic diagram of a portion of magnetic tape showing the recording arrangement of information tracks extending obliquely on the magnetic tape and the relation of a control signal recorded at the edge of the magnetic tape for the PAL and SECAM television systems, in accordance with the previously-proposed VTR.

On the other hand, the PAL and SECAM television systems have 625 horizontal scanning lines for each frame of the television signal and have a vertical frequency of 50 Hz. In this regard, it has been proposed to provide a digital video tape recorder (VTR) which can record and reproduce television signals of a first television system, that is, the NTSC television system, and a second television system, that is, the PAL or SECAM television system. With such digital VTR, for use with the NTSC television system, each field of the picture on the television screen is divided into five segments, as shown in FIG. 1. In this manner, each field interval of the digitized video signal is recorded in five successive, parallel tracks T extending obliquely on magnetic tape TP, as shown in FIG. 3, and a control signal a is recorded along the lower edge of magnetic tape TP corresponding to each field interval of the digitized video signal, that is, for every five tracks. On the other hand, with the PAL and SECAM television systems, the previously-proposed digital VTR divides each field of the picture on the television screen into six segments, as shown in FIG. 2, and each field interval of the television signal is recorded in six successive, parallel tracks T extending obliquely on magnetic tape TP, as shown in FIG. 4. In such case, a control signal a is also recorded at the lower edge of magnetic tape TP corresponding to each field interval, that is, for each six tracks. The control signal a recorded at the lower edge of magnetic tape TP for all of the above television systems is used during reproduction in a phase servo operation for the capstan motor to control movement of magnetic tape TP in regard to the rotary magnetic heads. However, in the arrangements of FIGS. 3 and 4, the interval between adjacent control pulses of control signal a is too great to provide an accurate phase servo operation during reproduction of the tracks T positioned between adjacent control pulses of control signal a. It is to be appreciated that this problem can not be solved merely be adding additional control pulses, in view of the different television systems that can be utilized.

Accordingly, the present invention provides a control pulse for each track on the magnetic tape for each of the NTSC, PAL and SECAM television systems, in response to the incoming television signal. More particularly, as shown in FIG. 5, a reference signal generating circuit 2 is provided for generating a reference signal having a reference frequency of 13.5 MHz which is equal to the sampling frequency for a digital color video signal. Reference signal generating circuit 2 includes a phase-locked loop (PLL) circuit 4 which generates a signal having a frequency of 108 MHz which is supplied to additional circuitry (not shown) for controlling a capstan motor to move magnetic tape TP at a constant speed, and a frequency dividing circuit 6 which frequency-divides the signal from PLL circuit 4 having a frequency of 108 MHz by eight ($\frac{1}{8}$). In this regard, the output from frequency dividing circuit 6 constitutes the aforementioned reference signal having a frequency of 13.5 MHz as the output of reference signal generating circuit 2. It is to be appreciated that the frequency 13.5 MHz is 858 times higher than the horizontal frequency of an NTSC television signal and is 864 times higher than the horizontal frequency of a PAL or SECAM television signal. Further, for recording and reproduction, the sampling frequency of the digital video signal is selected as an integral multiple of the reference frequency of 13.5 MHz.

The reference signal from frequency dividing circuit 6 is supplied to a frequency dividing circuit 8 and a frequency dividing circuit 10 which frequency-divides the reference signal by the dividing ratios 1/45045 and 1/45000, respectively. The output signals from frequency dividing circuits 8 and 10 constitute the control signals a for recording with the first or NTSC television system and the second or PAL and SECAM television systems, respectively. It is to be appreciated that the ratios 1/45045 and 1/45000 for frequency dividing circuits 8 and 10, respectively, are selected with respect to the reference frequency of 13.5 MHz so as to produce 10 control pulses for each frame interval of the first television system, that is, the NTSC television system, and 12 control pulses for each frame interval of the second television system, that is, the PAL or SECAM television system. In this regard, the time interval between adjacent control pulses of control signal a is equal to 3.3367 msec. for the NTSC television system and 3.3333 msec. for the PAL and SECAM television systems. Thus, the time difference between pulse intervals for control signal a in the first and second television systems is only 3.5 μsec. so that the control pulses of control signal a for each system can be satisfactorily reproduced.

The output control signals a from frequency dividing circuits 8 and 10 are supplied to respective fixed terminals 12a and 12b of a single pole, double throw switch 12 having a movable arm 12c which is controlled to supply one of the control signals a from terminal 12a or 12b through a recording amplifier 14 to a CTL magnetic head 16 which records the respective control signal a at the lower edge of magnetic tape TP for each information track T thereon by saturation recording. For example, when an NTSC color video signal is to be recorded in tracks T on magnetic tape TP, movable arm 12c is moved into contact with terminal 12a to supply control signal a from frequency dividing circuit 8 to magnetic head 16 so that the control pulses of control signal a are recorded at the lower edge of magnetic tape TP for each track T thereon, as shown in FIG. 6. On the other hand, when recording a PAL or SECAM television signal, movable arm 12c of switch 12 contacts terminal 12b to supply control signal a from frequency dividing circuit 10 to magnetic head 16 so that the control pulses of control signal a are recorded at the lower edge of magnetic tape TP for each track T thereon, as shown in FIG. 7. It is to be appreciated that, although a mechanical switch 12 has been shown in FIG. 5, a semiconductor switching arrangement may be substituted therefor.

Further, in accordance with the present invention, the vertical synchronizing signal of the television signal to be recorded is supplied from an input terminal 18 to frequency dividing circuits 8 and 10 to control the frequency dividing circuits to produce the respective control signals a in synchronism with each other. The vertical synchronizing signal from input terminal 18 is also supplied to a discriminator circuit 20 which discriminates or determines whether the vertical synchronizing signal of the television signal to be recorded is from an NTSC television system or PAL and SECAM television systems. More particularly, discriminator circuit 20 determines from the vertical synchronizing signal whether the vertical frequency of the incoming television signal is 60 Hz of the NTSC television system or 50 Hz of the PAL and SECAM television systems. Accordingly, discriminator circuit 20 produces an output signal which is supplied to switch 12 to change over the latter between frequency dividing circuits 8 and 10. For example, when discriminator circuit 20 determines that the vertical frequency of the vertical synchronizing signal is 60 Hz, switch 12 is controlled thereby to supply control signal a from frequency dividing circuit 8 to magnetic head 16, as shown in FIG. 5. On the other hand, when discriminator circuit 20 determines that the vertical frequency of the vertical synchronizing signal is 50 Hz, switch 12 is controlled thereby to supply control signal a from frequency dividing circuit 10 to magnetic head 16.

Thus, in accordance with the present invention, control pulses of control signal a are recorded at the edge of magnetic tape TP for each track T thereon, regardless of whether the NTSC, PAL or SECAM television system is used. In this regard, the phase servo operation for the capstan motor during reproduction is accurate for any of the above systems. It is to be appreciated that, during reproduction, since the tape speed is constant for all of the above television systems, the control signal a as reproduced is supplied to a comparator circuit where it is compared with a reference frequency, and the output of the comparator circuit is used to provide an error control for the capstan motor. For example, for the PAL television system, the control signal a reproduced from magnetic tape TP would be compared with a reference signal identical to that generated at the output of frequency dividing circuit 10, which is generated by PLL circuit 4, frequency dividing circuit 6 and frequency dividing circuit 10.

It is to be appreciated that various modifications can be made to the present invention by one of ordinary skill in the art within the scope of the claims herein. For example, it is possible that the frequency-dividing ratios of frequency dividing circuits 8 and 10 are further increased by a factor which is an even number, for example, $\frac{1}{2}$. In such case, the frequency-dividing ratio of frequency-dividing circuit 10 would be 1/90000. It is to be appreciated that, in such case, a greater number of control pulses would be recorded on magnetic tape TP in comparison with the aforementioned arrangement, for example, two pulses for each track. However, such additional pulses do not cause any problems with the operation of the apparatus.

Having described a specific preferred embodiment of the invention with reference to the accompanying drawings, it is to be understood that the present invention is not limited to that precise embodiment, and that various changes and modifications may be effected therein by one skilled in the art without departing from the scope or spirit of the invention as defined in the appended claims.

What is claimed is:

1. Apparatus for recording information signals in a plurality of oblique tracks on a record medium, comprising:
   means for generating a reference signal having a reference frequency;
   first means for producing a first control signal corresponding to an information signal having a first format in response to said reference signal;
   second means for producing a second control signal corresponding to an information signal having a second, different format in response to said reference signal;
   transducer means for recording, for each of said plurality of parallel tracks one of said first control signal and said second control signal in a control track extending longitudinally on said record medium; and
   switch means for switching one of said first control signal and said second control signal to said transducer means in response to said information signal to be recorded.

2. Apparatus according to claim 1; in which said means for generating a reference signal includes phase-locked loop means for producing a first signal and frequency dividing means for frequency-dividing said signal from said phase-locked loop means to produce said reference signal.

3. Apparatus according to claim 2; in which said signal from said phase-locked loop means has a frequency of 108 MHz and said frequency dividing means has a frequency-dividing ratio of $\frac{1}{8}$.

4. Apparatus according to claim 1; in which said first means includes frequency dividing means for frequency-dividing said reference signal to produce said first control signal.

5. Apparatus according to claim 4; in which said frequency dividing means divides the frequency of said reference signal with a frequency-dividing ratio of 1/45045 for use with an NTSC television system.

6. Apparatus according to claim 1; in which said second means includes frequency dividing means for dividing the frequency of said reference signal to produce said second control signal.

7. Apparatus according to claim 6; in which said frequency dividing means divides the frequency of said reference signal with a frequency-dividing ratio of 1/45000 for use with a PAL or SECAM television system.

8. Apparatus according to claim 1; further including switch control means for controlling said switch means to switch one of said first control signal and said second control signal to said transducer means in response to said information signal to be recorded.

9. Apparatus according to claim 8; in which said information signal to be recorded has one of first and second vertical frequencies; and in which said switch control means determines which of said first and second vertical frequencies said information signal to be recorded has and produces an output signal in response thereto for controlling said switch means to switch said first control signal to said transducer means when said information signal to be recorded has said first vertical frequency and switches said second control signal to said transducer means when said information signal to be recorded has said second vertical frequency.

10. Apparatus according to claim 8; in which said information signal to be recorded includes a vertical synchronizing signal which is supplied to said first and second means for synchronizing said first and second control signals produced thereby.

* * * * *